Figure 1:
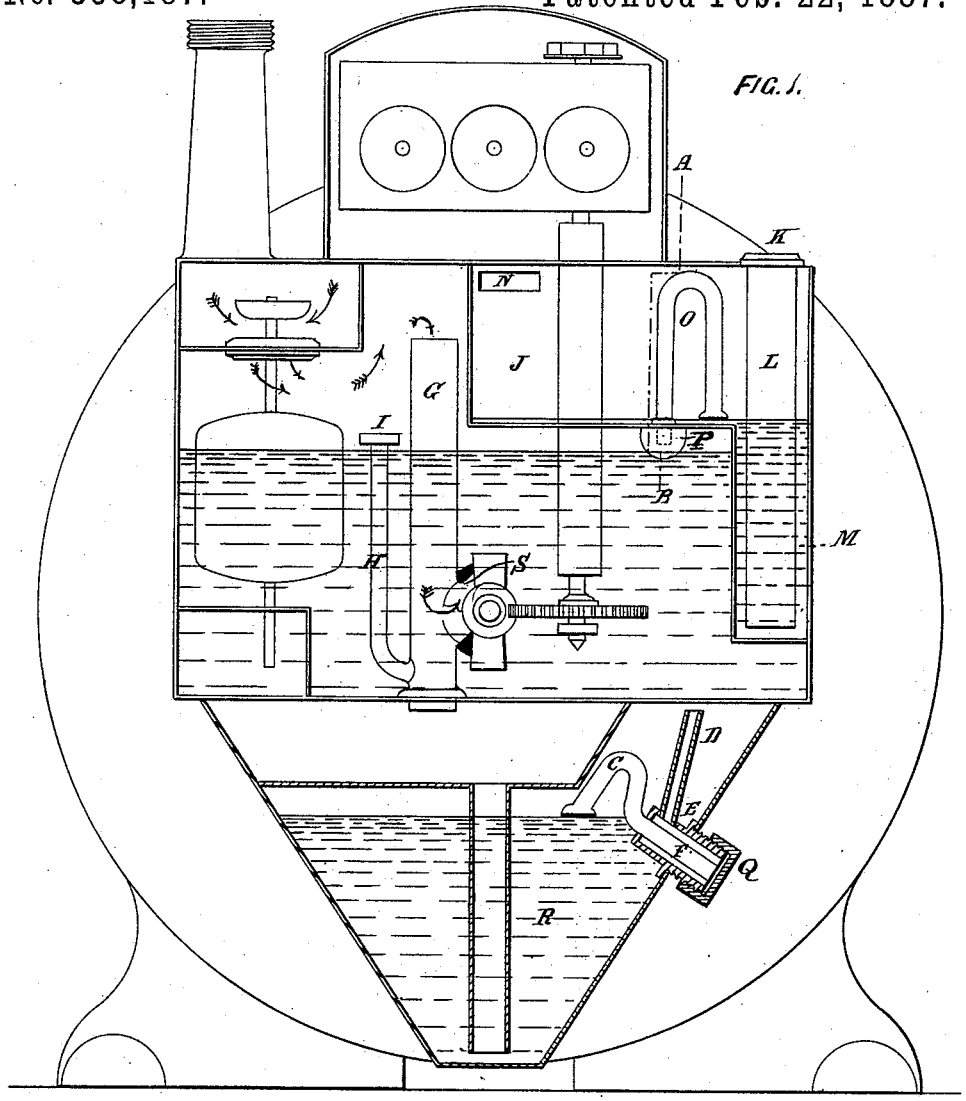

(No Model.) 2 Sheets—Sheet 1.

W. COWAN.
GAS METER.

No. 358,187. Patented Feb. 22, 1887.

WITNESSES.  
Geo. W. Rea,  
Robert Everett,

INVENTOR.  
William Cowan,  
By James L. Norris,  
Atty.

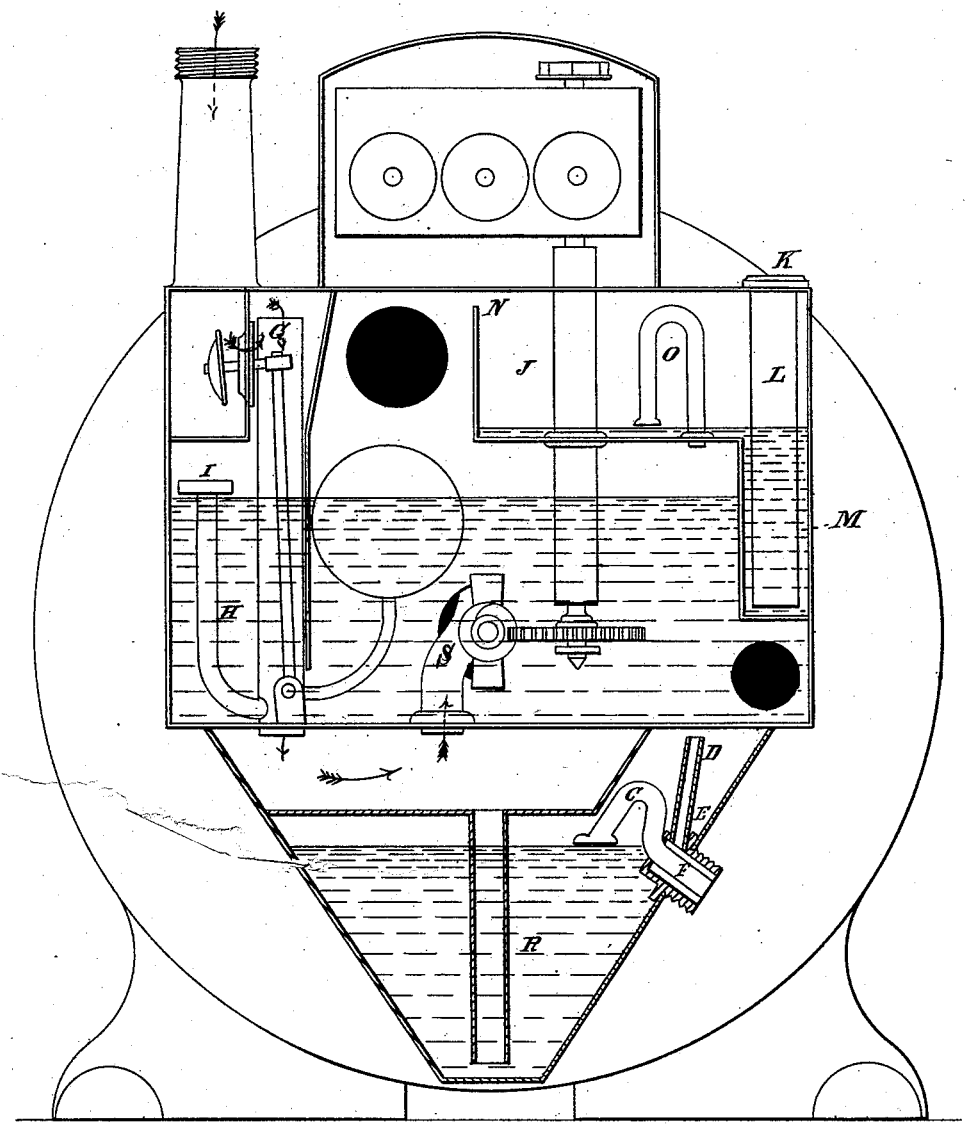

UNITED STATES PATENT OFFICE.

WILLIAM COWAN, OF EDINBURGH, SCOTLAND.

GAS-METER.

SPECIFICATION forming part of Letters Patent No. 358,187, dated February 22, 1887.

Application filed May 3, 1886. Serial No. 200,976. (No model.)

*To all whom it may concern:*

Be it known that I, WILLIAM COWAN, of Edinburgh, Scotland, have invented new and useful Improvements in Gas-Meters, of which the following is a specification.

The object of this invention is to provide improved means for adjusting and ascertaining the level of the water in wet gas-meters.

It has hitherto been usual to determine the water-level by the height of an overflow stand-pipe, down which any surplus water might pass to the waste-chamber below, where it would rise to the bottom plug-opening and there escape. The bottom plug-opening has been either itself "sealed" by means of a pipe led from it into the water of the waste-chamber, or else the overflow stand-pipe has been directly or indirectly continued down into the waste-chamber and there sealed in like manner. Whichever plan has been adopted the object has been to prevent the passage of gas at ordinary pressures through the bottom plug-opening in the event of the plug being out. In either case the water in the waste-box has always attained the level of the bottom plug-opening, above which, when unplugged, it could not rise without escaping. During the process of watering a meter it is desirable and usual to close the main tap and to open one or more burners, in order to relieve the interior of the meter from pressure and to allow the water to attain a uniform level. When, therefore, the proper level has been reached, the surplus water has passed into the waste-box and escaped from the bottom plug-opening in a full stream. It has often happened, however, that pressure within the meter has been produced by the water being supplied more quickly than the gas (or air) could escape through the open burner or burners, and this has caused a premature discharge of water from the bottom plug-opening before the waste-chamber has received any water through the overflow stand-pipe. This has frequently misled those who are not very careful and experienced, and has induced the cessation of watering and the replacement of the bottom plug before the meter has been perfectly charged. An attempt has been made to prevent this premature discharge of water by employing a siphon as the means of communication between the waste-box and the bottom plug opening. In this way it has been necessary not only that the water should rise to the height of the opening, but considerably above it, so as to overtop and charge the siphon before it could escape. The siphon has then removed the water down to the level of the end of its shorter leg, and so has prevented the premature escape of water above referred to. The plan of using a siphon has, however, hitherto been open to serious objections. It has been necessary to provide a constantly open passage between the waste-water chamber and the atmosphere, and also to leave the termination of the longer leg of the siphon open and unplugged. The reason will be obvious. If there were no open passage for air, the siphon would not work, and if the siphon itself were not also open to the atmosphere, any water which might pass down the overflow stand-pipe after the siphon had determined the level in the waste-box might choke the spout. The liability to this is apt to be increased by the use of a siphon in the waste-water box, because the action of the stand-pipe in adjusting the level of the water in the meter is slow and uncertain compared with that of the siphon in adjusting the level of the water in the waste-box. Therefore, with a stand-pipe in the meter and a siphon in the waste-box, the work of the latter may be completed while that of the former is still going on, for although care may be taken to adjust the proportion of the siphon to the power of the stand-pipe, it is practically impossible that this should be done, so that no water will pass down the stand-pipe after the siphon has completed its work; hence the necessity which has been found for leaving the siphon open.

The present invention consists in providing means whereby both the siphon and the air-passage may remain closed against the atmosphere except during the process of watering, and in substituting a siphon for the usual stand-pipe for the purpose of determining the water-level of the meter; and, further, in providing means for preventing the water-level being raised by the addition of water (after the level has been determined) in less quantity than would be necessary to charge the siphon and bring it into operation for the removal of such surplus.

The advantage of using a siphon to determine the water-level in the meter consists, mainly, in this, that it can with certainty be made to complete its action before the waste-chamber siphon has ceased to run, and by this means the stoppage of the flow from the latter proves that the water-level of the meter has been definitely adjusted, and that the plug may be replaced with confidence.

Figure 2:
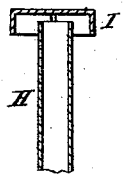
Figure 3:
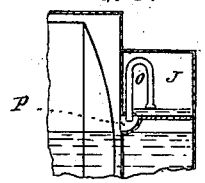

In order that the invention may be easily understood drawings are attached hereto, Figure 1 being a front elevation of the meter with the front plate removed and the waste-water box in section. Fig. 2 is a section of the pipe H and cap I, drawn to a larger scale; and Fig. 3, a section through A B of Fig. 1, showing how the water, when poured into the chamber J, is conveyed into the back of the meter. Fig. 4 is a similar view to that of Fig. 1, exhibiting the mode of adapting the invention to a meter with side-valve arrangement.

In carrying out the invention the waste-water box R has a siphon, C, constructed with a supplementary air-pipe, D, which reaches up above the top of the siphon and terminates at its lower end in a socket, E, which also receives the end of the longer leg, F, of the siphon. The ends of both siphon and air-pipe are passed into and fixed in this socket, and are kept separate from each other to the extreme or outer end of the socket, which is screwed on its outer surface to receive the cap Q, which, when on, closes both air-pipe and siphon against the atmosphere. Both air-passage and water-outlet are therefore closed by a screwed cap, instead of the latter being closed in the more usual manner by a screwed metal plug; hence when the cap is off (during watering) this siphon and its connected air-pipe act in the same manner as the open siphon and air-channel above referred to; but the present invention offers in regard to these the great advantage of allowing both to be closed and by one cap.

The siphon which determines the water-level of the meter, the application of which constitutes an essential feature of this invention, may be formed in any convenient way. It may be a stand-pipe with its upper end bent downward nearly to the level of the water it is intended to determine; or it may be a straight stand-pipe with a cap like I, of greater diameter, over its upper end, in a similar manner to that shown fixed to the auxiliary pipe H, the stand-pipe in this case forming the longer leg and the cap the shorter leg of the siphon. The siphon in whatever form will remove the water more quickly and effectually than a simple stand-pipe would do it, and in determining the level the final action will be precise and immediate and not slow and uncertain, as is the case when a mere stand-pipe is employed. I therefore construct the spout and stand-pipe G, which rises considerably above the proper water-level and is open both at top and bottom, with a smaller pipe, H, attached to it, the pipe being surmounted by a cap, I, and forms a siphon for determining the true water-line, which, when adjusted, will always stand a little below the top of the pipe H. The pipe G is for conveying the gas which has not yet been measured from the body of the meter to the spout S, and thence into the measuring-chamber.

In determining the water-level the action of a siphon differs from that of a mere stand-pipe in another important particular not yet mentioned. Allowing for the "heaping" due to attraction, the height of the water determined by a mere stand-pipe is practically that of the stand-pipe itself, because any surplus overflows into the waste-box; but when the level is determined by a siphon the water stands at a lower level than the entrance to the siphon's shorter leg, which of course makes it possible by adding water more or less to raise the level without bringing the siphon into action for the removal of the surplus. The possibility of such an addition to the water in a meter might make it fail to comply with the requirements of a practically perfect measuring-instrument, and I have therefore designed the following simple and thoroughly effective means for preventing the addition of any water to the meter less than the full quantity necessary to bring the siphon into operation and to restore the true level.

For the above purpose I construct a box or chamber, J, within or in connection with the upper part of the meter-case, capable of holding enough water to bring the siphon into action when the water in the meter is at or near its proper level. This box or chamber receives all the water from the charge-plug K, whose filling-tube (or "side piece") L is sealed by dipping down into a "trough" or "well," M, formed by deepening a portion of the bottom of the box or chamber J. The water first fills the box J, and then overflows into the meter through an opening, N, near the top, or in some instances by a stand-pipe. The water which the box would otherwise retain is removed into the meter by a siphon, O, (the longer leg of which dips into a conduit, P,) which the water by being above the bend when the box is full charges. It is thus evident that no water can enter the body of the meter until the box has been filled, and also that almost no water can remain in the box after it has been filled; but inasmuch as the box J will retain all the water that can be put into it short of the quantity necessary to fill it, and so charge the siphon O, it follows that any less quantity of water than the contents of the box cannot at any time be added to the water in the meter. It will thus be seen that no water-level above the true one is attainable.

To prevent the occurrence of what is known as "siphoning," it is desirable that the water-level siphon H should not be too large and powerful, but in due proportion to the admission of air through the minimum opening likely to be allowed during the process of watering. In like manner, although it is indispensable that the water-level siphon shall have ceased running before the waste-box siphon O shuts off, it is necessary that this interval should be as short as possible, so that water may not accumulate in the waste-box to such an extent as to rise and choke the spout, and in this way to produce siphoning.

Having now particularly described and ascertained the nature of my said invention and in what manner the same is to be performed, I declare that what I claim is—

1. The combination, with the chamber J, having a sealed charge-plug and a discharge-opening, N, of the siphon O and conduit P, substantially as described.

2. The combination, with the main water-chamber, the waste-chamber, and the stand-pipe G, communicating with the spout S, of a siphon communicating with the stand-pipe to determine the water-level in the meter, substantially as described.

3. The combination, with the waste-chamber R, siphon C F, and air-pipe D, of a socket, E, communicating with the lower end of said air-pipe and receiving the longer leg, F, of the siphon, and a cap, Q, fitting said socket to close the air-pipe and siphon at once against the atmosphere, substantially as described.

4. A gas-meter comprising the filling-chamber J, having well M and filling-tube L, waste-chamber R, having siphon C F, and air-pipe D, stand-pipe G, and a siphon to determine the water-level in the meter, substantially as described.

WILLIAM COWAN.

Witnesses:
A. STEIN,
J. A. MACLEOD.